United States Patent
Takada et al.

(10) Patent No.: US 10,404,721 B2
(45) Date of Patent: Sep. 3, 2019

(54) COMMUNICATION DEVICE FOR DETECTING TRANSMISSION OF AN IMPROPER MESSAGE TO A NETWORK

(71) Applicants: NATIONAL UNIVERSITY CORPORATION NAGOYA UNIVERSITY, Nagoya-shi, Aichi (JP); AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hiroaki Takada, Nagoya (JP); Ryo Kurachi, Nagoya (JP); Hiroshi Ueda, Yokkaichi (JP); Satoshi Horihata, Yokkaichi (JP)

(73) Assignees: NATIONAL UNIVERSITY CORPORATION NAGOYA UNIVERSITY, Nagoya (JP); AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/753,932

(22) PCT Filed: Aug. 10, 2016

(86) PCT No.: PCT/JP2016/073639
§ 371 (c)(1),
(2) Date: Feb. 20, 2018

(87) PCT Pub. No.: WO2017/038422
PCT Pub. Date: Mar. 9, 2017

(65) Prior Publication Data
US 2018/0255072 A1    Sep. 6, 2018

(30) Foreign Application Priority Data

Aug. 31, 2015  (JP) .................................. 2015-171191

(51) Int. Cl.
*H04L 12/26*   (2006.01)
*H04L 29/06*   (2006.01)
(Continued)

(52) U.S. Cl.
CPC .............. *H04L 63/14* (2013.01); *H04L 12/40* (2013.01); *H04L 12/40163* (2013.01);
(Continued)

(58) Field of Classification Search
None
See application file for complete search history.

(56) References Cited

U.S. PATENT DOCUMENTS 6,434,112 B1 *   8/2002   Kwon ................. H04L 12/4015
                                                           370/216
9,130,982 B2     9/2015   Gottlieb et al.
(Continued)

FOREIGN PATENT DOCUMENTS

| JP | 2006-191338 A | 7/2006 |
| JP | 2011-103577 A | 5/2011 |
| JP | 2014-11621 A | 1/2014 |
| JP | 2014-86812 A | 5/2014 |
| WO | 2013/188611 A2 | 12/2013 |

OTHER PUBLICATIONS

Lin "Analysis and Modeling of a Priority Inversion Scheme for Starvation Free Controller Area Networks" 2010 (Year: 2010).*
(Continued)

*Primary Examiner* — Siren Wei
(74) *Attorney, Agent, or Firm* — Oliff PLC

(57) ABSTRACT

A communication device capable of detecting transmission of an improper message to a network. A CAN controller in the gateway transmits and receives a message attached with a priority level (ID) to/from an ECU through a communication line, and counts, by the consecutive block number counter, the number of transmitted messages that are con- (Continued)

secutively blocked as a result of arbitration processing as the number of consecutive blocks and stores the number as the number of allowed blocks into an allowed block number table in the storage unit in association with a priority level attached to the message received at the communication line. Every time a message is received, the controller compares the number of consecutive blocks with the number of allowed blocks for this message, and detects abnormality if the number of consecutive blocks is larger than the number of allowed blocks.

5 Claims, 15 Drawing Sheets

(51) Int. Cl.
  *H04L 12/40* (2006.01)
  *H04L 12/66* (2006.01)
(52) U.S. Cl.
  CPC .............. *H04L 12/66* (2013.01); *H04L 63/00* (2013.01); *H04L 2012/40215* (2013.01); *H04L 2012/40273* (2013.01)

(56) References Cited

U.S. PATENT DOCUMENTS

| | | | |
|---|---|---|---|
| 9,634,859 B2* | 4/2017 | Brunnberg | ........ H04L 12/40006 |
| 2001/0053178 A1* | 12/2001 | Yano | ....................... H04B 1/707 |
| | | | 375/150 |
| 2015/0089236 A1* | 3/2015 | Han | ....................... H04L 9/3242 |
| | | | 713/181 |

OTHER PUBLICATIONS

Koscher et al., "Experimental Security Analysis of a Modern Automobile," In Proc. of the IEEE Symposium on Security and Privacy, 2010, pp. 447-462.

Lin, Cheng-Min, "Analysis and Modeling of a Priority Inversion Scheme for Starvation Free Controller Area Networks," IEICE Transactions on Information and Systems, 2010, vol. E93-D, No. 6, pp. 1504-1511.

Oct. 18, 2016 International Search Report issued in International Patent Application No. PCT/JP2016/073639.

Apr. 23, 2019 Decision to Grant issued in Japanese Patent Application 2015-171191.

* cited by examiner

FIG. 4

ALLOWED BLOCK NUMBER TABLE

| ID (PRIORITY LEVEL) | NUMBER OF ALLOWED BLOCKS |
|---|---|
| 0x001 | 1 |
| 0x002 | 2 |
| 0x003 | 3 |
| 0x004 | 4 |
| 0x005 | 5 |
| ⋮ | ⋮ |

COMMUNICATION DEVICE FOR DETECTING TRANSMISSION OF AN IMPROPER MESSAGE TO A NETWORK

CROSS-REFERENCE TO RELATED APPLICATIONS

This application is the national phase under 35 U.S.C. § 371 of PCT International Application No. PCT/JP2016/073639 which has an International filing date of Aug. 10, 2016 and designated the United States of America.

FIELD

The present disclosure relates to a communication device that transmits and receives messages via a communication line.

BACKGROUND

Conventionally, multiple electronic control units (ECUs) are mounted to a vehicle and are connected with each other via a network such as a controller area network (CAN).

The multiple ECUs perform individual processing while exchanging information through the network. In recent years, the scale of in-vehicle networks tends to be increased, where such a structure is often employed that multiple small-sized networks are connected to a relay device such as a gateway, which relays a message between the networks.

Japanese Patent Application Laid-Open No. 2014-86812 describes a CAN system which aims to enhance fault tolerance by transmitting a retransmission request frame if the first node in the CAN system fails to receive a frame and is in an error passive state, storing the frame transmitted to a communication line in the second node, and retransmitting the frame for which retransmission is requested to the first node.

Japanese Patent Application Laid-Open No. 2011-103577 describes a communication system that aims to prevent erroneous operation on the reception side of a frame with a configuration where a CAN controller measures a transmission latency from the input of a frame to the start of transmission to a communication line and transmits the frame together with information related to the transmission latency, while the CAN controller that received the frame decides processing to be executed in accordance with the transmission latency.

SUMMARY

K. Koscher, A. Czeskis, F. Roesner, S. Patel, T. Kohno, S. Checkoway, D. McCoy, B. Kantor, D. Anderson, H. Shacham, and S. Savage; Experimental Security Analysis of a Modern Automobile; In Proc. of the IEEE Symposium on Security and Privacy, pages 447-462, 2010, however, reports that an improper, i.e. unauthorized, message may be transmitted to a network in a vehicle by injecting an unauthorized program to the ECU. If an improper message is transmitted based on an unauthorized program, malfunction may occur in another ECU connected to the network.

For such improper message transmission, neither the CAN system according to Japanese Patent Application Laid-Open No. 2014-86812 nor the communication system according to Japanese Patent Application Laid-Open No. 2011-103577 could present effective measures.

Moreover, a so-called DoS attack is known, where an ECU injected with an unauthorized program transmits a large amount of messages to a network, which blocks communication by other ECUs and causes trouble in a communication system. In recent years, the possibility of a DoS attack has been pointed out also in a communication system mounted to a vehicle, and the measures against such an attack have been desired.

The present disclosure has been made in view of the above circumstances, and aims to provide a communication device capable of detecting transmission of an improper message to a network.

A communication device according to an aspect of the present disclosure comprising a communication unit transmitting and receiving a message attached with a priority level via a communication line, and an arbitration part arbitrating, in a case where message transmission from the communication device and message transmission from a different device are concurrently performed, to decide which message transmission is to be performed based on the priority level, further comprises: a consecutive block number storage unit in which the number of consecutive blocks, which corresponds to the number of messages consecutively blocked from being transmitted as a result of arbitration by the arbitration part, is stored; an allowed block number storage unit in which the number of allowed blocks, which corresponds to the number of consecutive messages allowed to be blocked, is stored in association with the priority level; and a detection unit detecting abnormality concerning communication based on the number of consecutive blocks stored in the consecutive block number storage unit and the number of allowed blocks stored in the allowed block number storage unit, for each message to be transmitted or received by the communication unit.

Moreover, the communication device according to another aspect of the present disclosure, wherein the detection unit determines, every time a message is to be transmitted from the communication unit, whether or not the number of consecutive blocks stored in the consecutive block number storage unit is larger than the number of allowed blocks stored in the allowed block number storage unit in accordance with the priority level attached to the message, and detects that abnormality concerning communication occurs at a time point when it is determined that the number of consecutive blocks is larger than the number of allowed blocks.

Moreover, the communication device according to another aspect of the present disclosure, wherein the detection unit determines, in a case where the communication unit receives a message, whether or not the number of consecutive blocks stored in the consecutive block number storage unit is larger than the number of allowed blocks stored in the allowed block number storage unit in accordance with the priority level attached to the message.

Moreover, the communication device according to another aspect of the present disclosure, further comprising: an accumulated bit number storage unit in which the accumulated number of bits in a message transmitted or received on the communication line is stored; and a second detection unit detecting abnormality concerning communication based on the accumulated number during a predetermined period of time.

Moreover, the communication device according to another aspect of the present disclosure, further comprising a control unit performing such control as to fix a potential of the communication line if the detection unit detects abnormality.

Moreover, the communication device according to another aspect of the present disclosure, further comprising a notification unit notifying a different device, if the detection unit detects abnormality, via a signal line different from the communication line.

According to an aspect of the present disclosure, the communication device transmits and receives a message attached with a priority level to/from a different device via a communication line. Moreover, the communication device performs arbitration processing based on a priority level to decide which message is to be transmitted if a message from the communication device and a message from a different device are concurrently transmitted and collide with each other. Such processing corresponds to arbitration processing according to, for example, the Controller Area Network (CAN) communication protocol.

The communication device according to the present disclosure that performs the processing described above counts the number of transmitted messages that are consecutively blocked, as the number of consecutive blocks, in the case where transmitted messages are blocked by the arbitration processing (that is, where the messages could not be transmitted as a result of losing in the arbitration). Furthermore, the communication device stores the number of consecutive messages to be transmitted that are allowed to be blocked, as the number of allowed blocks, in association with the priority levels attached to the messages. For each message to be transmitted or received, the communication device compares the number of consecutive blocks with the number of allowed blocks for the message. If the number of consecutive blocks is larger than the number of allowed blocks, the communication device may detect that some abnormal message transmission is being performed for the corresponding communication line.

Since the transmission of a message with high priority is not easily blocked by the arbitration processing whereas the transmission of a message with low priority is easily blocked, abnormal message transmission such as a DoS attack may precisely be detected by using the number of allowed blocks, which is stored for each of different priority levels of messages, in judgment on the presence or absence of abnormality.

According to another aspect of the present disclosure, every time a message is tried to be transmitted but is blocked by the arbitration processing, the communication device determines whether or not the counted number of consecutive blocks is larger than the number of allowed blocks corresponding to a priority level attached to the message to be transmitted. Accordingly, even before the transmission of a message is completed, abnormality may be detected at the time point when determined that the number of consecutive blocks is larger than the number of allowed blocks. This configuration is suitable in the case where each communication device included in a communication system individually performs processing of abnormality detection.

According to a further aspect of the present disclosure, the communication device constantly monitors consecutive messages on a communication line and counts the messages as the number of consecutive blocks. In the case of receiving a message, the communication device determines whether or not the number of consecutive blocks at this time point is larger than the number of allowed blocks according to the priority level attached to the received message. This configuration is suitable in the case where any one of the communication devices included in a communication system, e.g., a communication device such as a gateway, performs processing of abnormality detection, while the other communication devices do not perform abnormality detection processing.

According to another aspect of the present disclosure, the communication device performs abnormality detection by a yet another method in addition to the abnormality detection processing described above. That is, the communication device counts the number of accumulated bits in messages transmitted or received on a communication line, and detects abnormal message transmission on the communication line if, for example, the number of accumulated bits in a predetermined period of time exceeds a threshold. This abnormality detection method is suitable for detecting a DoS attack where a large number of improper messages are transmitted onto a communication line.

According to another aspect of the present disclosure, the communication device performs such control as to fix the potential of a communication line if abnormality is detected. This control prevents any communication device from transmitting messages to the communication line. Thus, even in the case where a communication device not performing the processing of abnormality detection for itself is present, the occurrence of abnormality may be recognized from the fixed potential of the communication line, and error processing or the like may be performed.

According to a further aspect of the present disclosure, if abnormality is detected, the communication device notifies a different communication device of the abnormality detection via another signal line different from the communication line through which messages are transmitted or received. Thus, even in the case where a communication device not performing the processing of abnormality detection for itself is present, the occurrence of abnormality may be recognized from reception of a notification through the signal line used for notification, and error processing or the like may be performed.

According to an aspect of the present disclosure, with the configuration where abnormality detection is performed by comparing the number of consecutive blocks for messages to be transmitted or received with the number of allowed blocks for each priority level attached to the messages, improper message transmission to a network may precisely be detected.

The above and further objects and features will more fully be apparent from the following detailed description with accompanying drawings.

BRIEF DESCRIPTION OF THE DRAWINGS

FIG. 4 is a schematic view illustrating an example of an allowed block number table;

DETAILED DESCRIPTION

Embodiment 1

Figure 1:
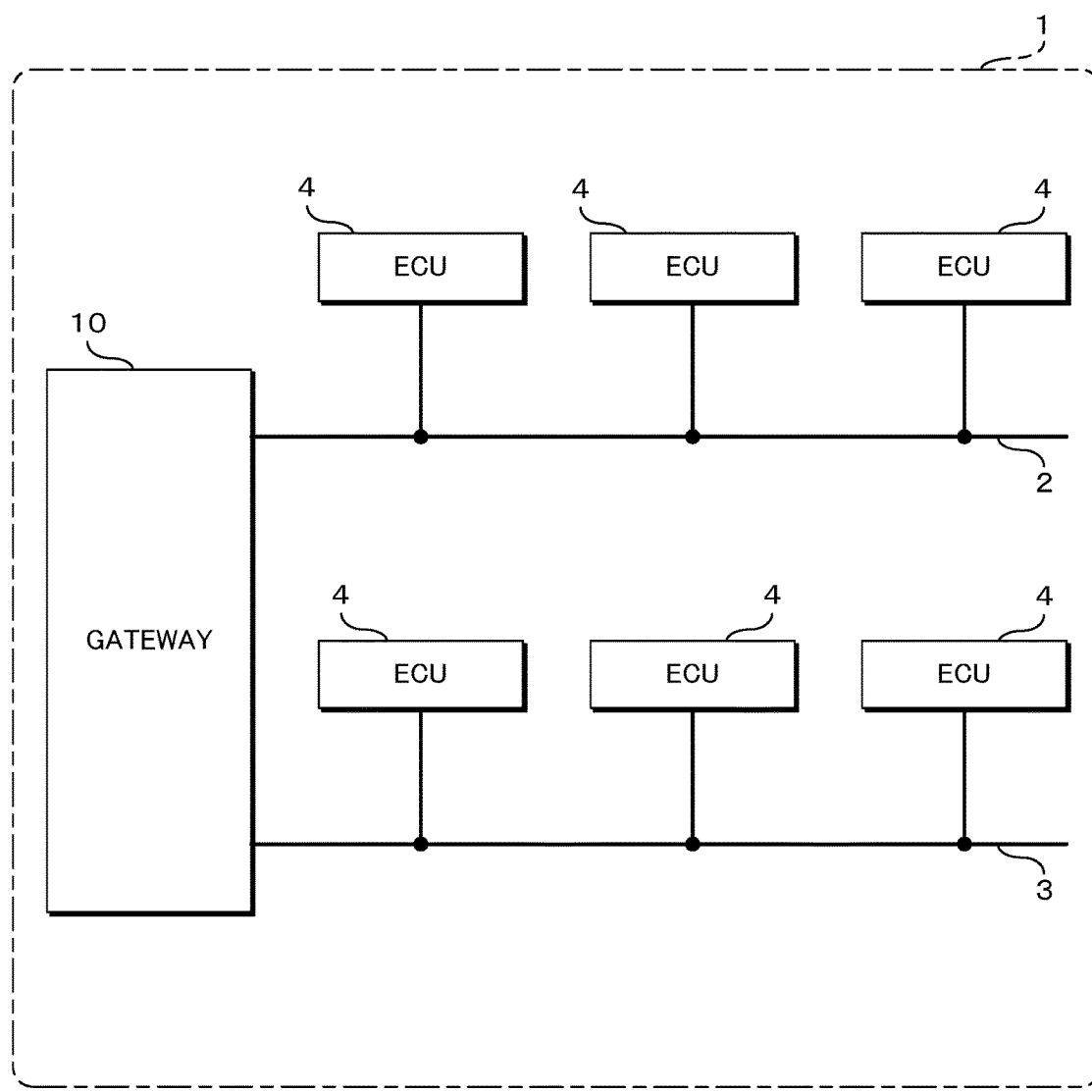
FIG. 1 is a block diagram illustrating the configuration of an in-vehicle communication system according to an embodiment of the present disclosure.

The present disclosure will specifically be described below with reference to the drawings illustrating the embodiments thereof. FIG. 1 is a block diagram illustrating the configuration of an in-vehicle communication system according to an embodiment of the present disclosure. The in-vehicle communication system according to the present embodiment is configured to include one gateway 10 and multiple electronic control units (ECUs) 4 that are mounted to a vehicle 1. In the illustrated example, six ECUs 4 are mounted to the vehicle 1 while these six ECUs 4 are divided into two groups. Three ECUs 4 in the first group are connected to the first communication line 2, through which the ECUs 4 transmit and receive messages to/from one another. Likewise, three ECUs 4 in the second group are connected to the second communication line 3, through which the ECUs 4 transmit and receive messages to/from one another.

The two communication lines 2 and 3 are not directly connected to each other but are individually connected to the gateway 10. The gateway 10 is a device that obtains a message output onto one communication line 2 for example, and outputs the obtained message to the other communication line 3, to relay the message between the groups (networks, communication lines). Accordingly, the message transmitted by the ECU 4 connected to the first communication line 2 is relayed by the gateway 10 and is received by the ECU 4 connected to the second communication line 3.

Figure 2:
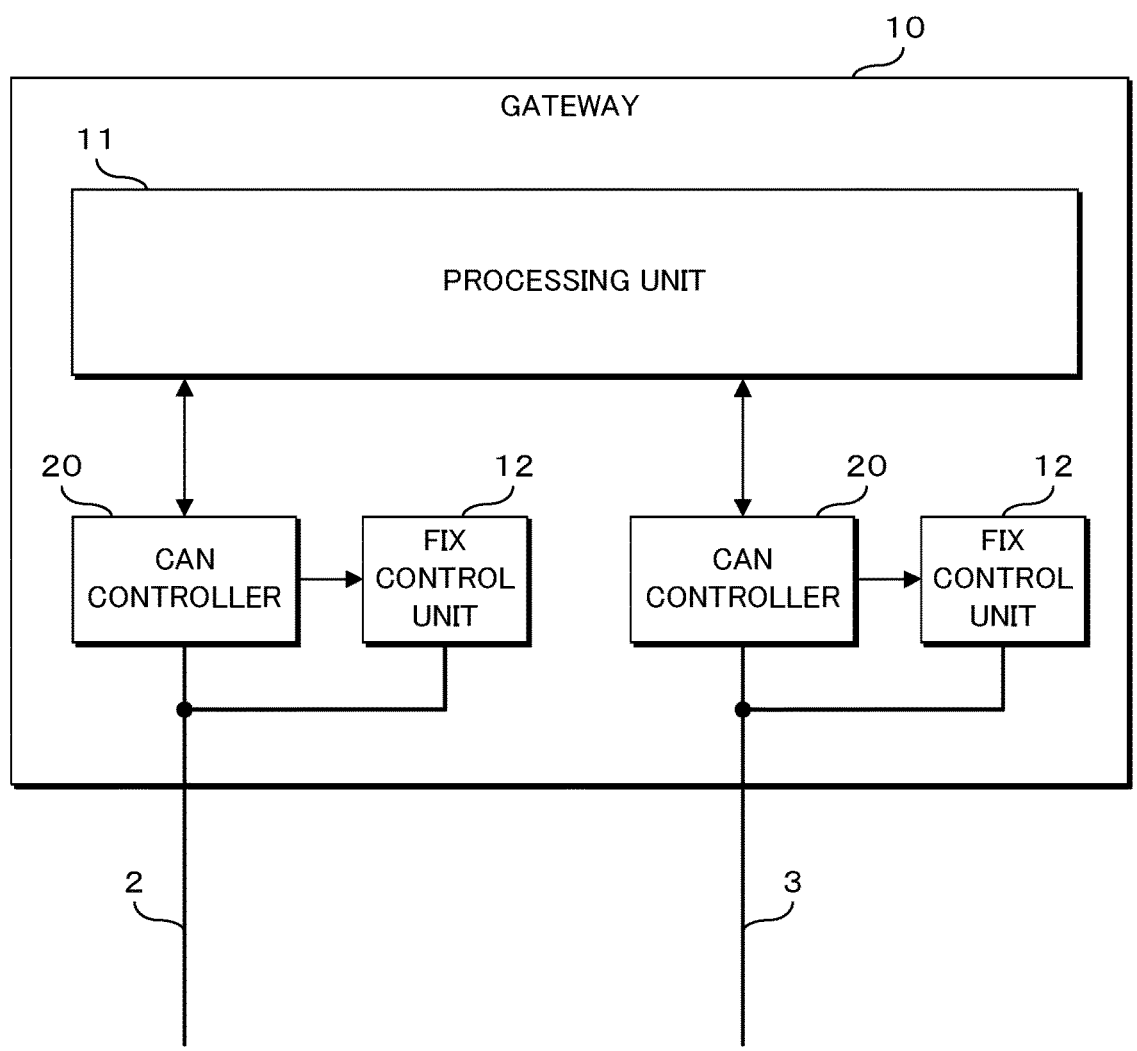
FIG. 2 is a block diagram illustrating the configuration of a gateway according to the embodiment.

FIG. 2 is a block diagram illustrating the configuration of the gateway 10 according to the present embodiment. The gateway 10 according to the present embodiment is configured to include a processing unit (processor) 11, two fix control units 12, two CAN controllers (transceivers) 20 and so forth. The processing unit 11 is configured with an arithmetic processing device such as a central processing unit (CPU) or a micro-processing unit (MPU), for example. The processing unit 11 reads out and executes a program stored in a read only memory (ROM) or the like, which is not illustrated, to perform various processing concerning relay of messages.

The two CAN controllers 20 are connected to the communication lines 2 and 3, and respectively transmits and receives messages to and from ECUs 4 through the communication line 2 or 3. The CAN controllers 20 receive messages by sampling and obtaining signals output by the ECU 4 to the communication line 2 or 3, and sends the received messages to the processing unit 11. Moreover, the CAN controllers 20 transmit messages to the ECU 4 by outputting the messages sent from the processing unit 11 as signals onto the communication line 2 or 3.

Each of the CAN controllers 20 is provided with one fix control unit 12. A set of CAN controller 20 and fix control unit 12 is connected to the common communication line 2 or 3. The fix control unit 12 performs such control as to fix the potential of the communication line 2 or 3 connected thereto, making it substantially impossible to transmit a message onto the communication line 2 or 3. The control by the fix control unit 12 is performed in response to a command sent from the CAN controller 20 in the same set. In the case where abnormal message transmission to the communication line 2 or 3 is detected, the CAN controller 20 sends a command to the fix control unit 12 to perform such control as to fix the potential.

Figure 3:
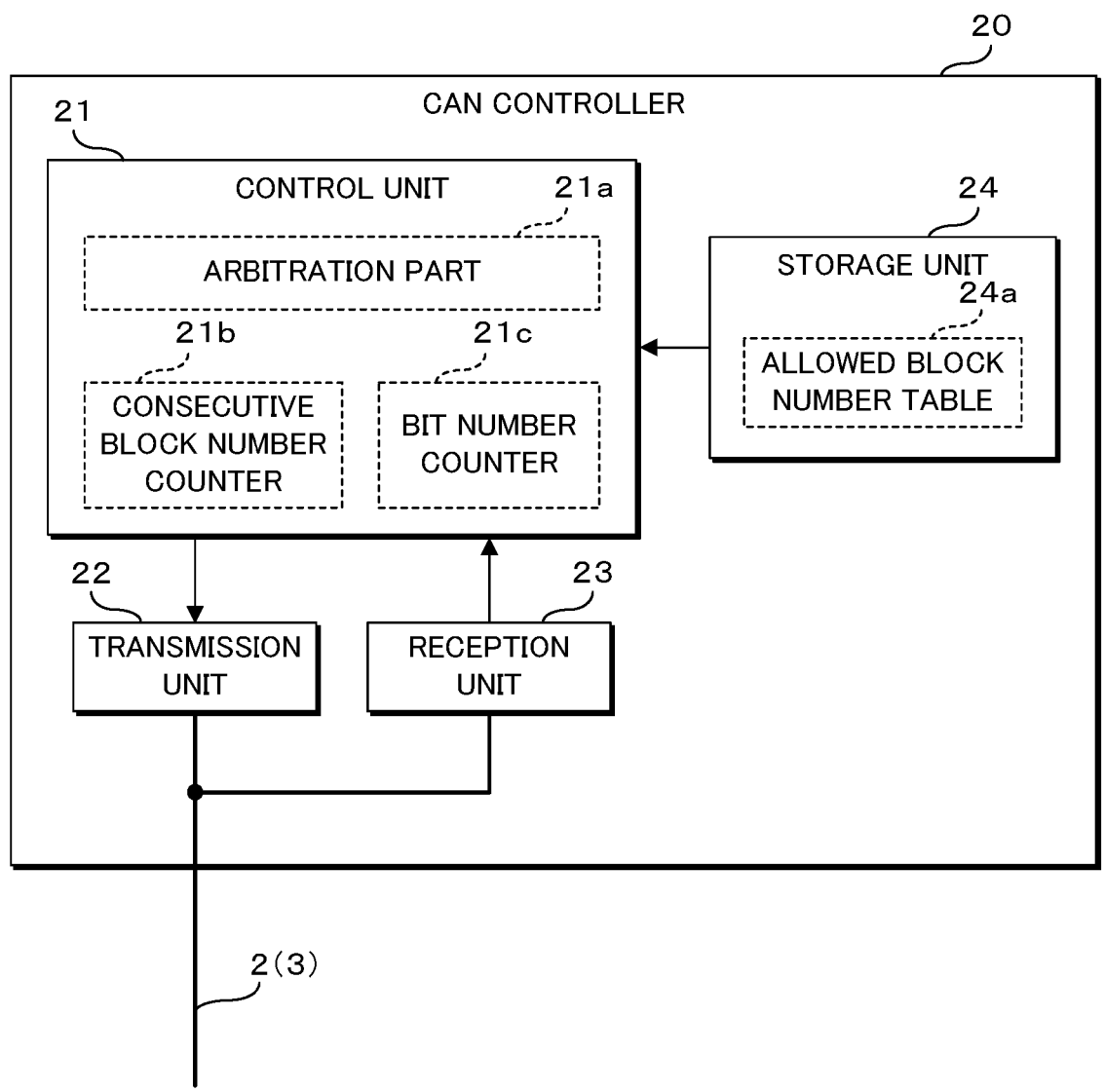
FIG. 3 is a block diagram illustrating the configuration of a CAN controller according to the embodiment.

FIG. 3 is a block diagram illustrating the configuration of the CAN controller 20 according to the present embodiment. The CAN controller 20 according to the present embodiment is configured to include a control unit 21, a transmission unit 22, a reception unit 23, a storage unit 24 and so forth. The control unit 21 performs control to implement transmission and reception of a message according to the CAN communication protocol by controlling the operation of each unit in the CAN controller 20. The control unit 21 performs message transmission by sending a message for transmission sent from the processing unit 11 in the gateway 10 to the transmission unit 22. The control unit 21 sends a reception message sent from the reception unit 23 to the processing unit 11. If a message transmitted by its own device collides with a message transmitted by another ECU 4, the control unit 21 performs arbitration processing to decide which message transmission is prioritized. It is noted that this arbitration processing is performed by an arbitration part 21a in the control unit 21. Moreover, the control unit 21 outputs a control command to the fix control unit 12.

The transmission unit 22 transmits a message by converting digital data sent from the control unit 21 as a transmission message into a binary electric signal of dominant/recessive and outputting the signal to the communication line 2 or 3 for each bit. The reception unit 23 samples the potential of the communication line 2 or 3 to obtain an electric signal on the communication line 2 or 3 as digital data, and sends the obtained digital data to the control unit 21 as a reception message. It is noted that the reception unit 23 performs sampling on the communication line 2 or 3 and sends digital data of a sampling result to the control unit 21 even during transmission of messages by the transmission unit 22. The arbitration part 21a in the control unit 21 determines whether or not the data transmitted by the transmission unit 22 matches with the data received here by the reception unit 23, to detect collision with a message transmitted by another ECU 4 on the communication line 2 or 3. It is noted that the arbitration processing performed by the arbitration part 21a is in accordance with the CAN communication protocol, and will not be described in detail.

The CAN controller 20 according to the present embodiment has a function of detecting that abnormal message transmission to the communication line 2 or 3 is performed by another device. It is noted that the CAN controller 20 according to the present embodiment detects abnormal message transmission by two methods as described below.

(1) Abnormal detection based on the number of consecutive blocks
(2) Abnormal detection based on the number of accumulated bits The CAN controller 20 includes a consecutive block number counter 21b and a bit number counter 21c in the control unit 21 as well as an allowed block number table 24a stored in the storage unit 24 in order to implement abnormality detection described above. The consecutive block number counter 21b is a counter for counting the number of messages that cannot be transmitted as a result of arbitration processing by the arbitration part 21a, and is employed for the abnormality detection of (1) above. The bit number counter 21c is a counter for counting the number of accumulated bits in the messages transmitted or received through the communication line 2 or 3, and is employed for the abnormality detection of (2) above. The storage unit 24 is configured with a non-volatile memory element such as a mask read only memory (ROM) or an electrically erasable programmable read only memory (EEPROM), for example, in which the allowed block number table 24a is stored in advance. The allowed block number table 24a is employed for the abnormality detection of (1) described above.

FIG. 4 is a schematic view illustrating an example of the allowed block number table 24a. In the allowed block number table 24a, the number of allowed blocks is stored in association with an ID attached to a message. The ID attached to a message according to the CAN communication protocol represents the priority level of the message. The smaller the numeric value is, the higher the priority level is. The number of allowed blocks is a numeric value indicating how many consecutive messages with the corresponding priority level are blocked from being transmitted as a result of arbitration processing. In the illustrated example, the number of allowed blocks is set as 1 for the highest priority level of 0x001, whereas the number of allowed blocks is set as 2 for the priority level of 0x002. The number of allowed blocks may be calculated by the following equation.

The number of allowed blocks=(the maximum number of consecutive messages with a high priority level that block a target message)+1

Furthermore, in the case of detecting some abnormality as a result of the two abnormality detection processing described above, the CAN controller 20 according to the present embodiment causes the control unit 21 to output a command to the fix control unit 12. Accordingly, the fix control unit 12 performs control to fix the potential of the communication line 2 or 3, to prohibit message transmission to the communication line 2 or 3. By the CAN controller 20 and the fix control unit 12 performing such control, the gateway 10 is able to notify the ECU 4 connected to the communication line 2 or 3 that abnormality is detected.

Figure 5:
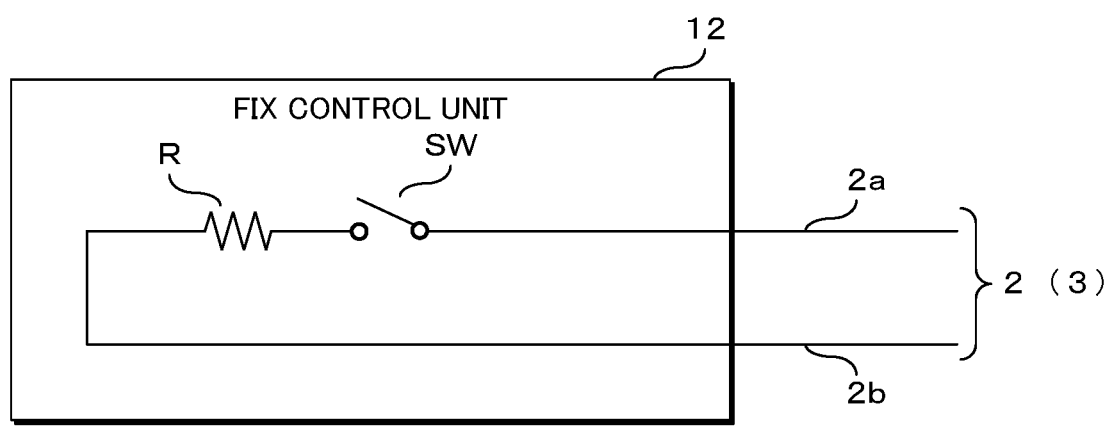
FIG. 5 is a circuit diagram illustrating a configuration example of a fix control unit.

FIG. 5 is a circuit diagram illustrating a configuration example of the fix control unit 12. While FIG. 5 illustrates the fix control unit 12 connected to the communication line 2, the fix control unit 12 connected to the communication line 3 also has a similar configuration. According to the CAN communication protocol, the communication line 2, which is configured with a twisted pair cable, includes two communication lines 2a and 2b in practice. As such, the gateway 10 and ECU 4 transmit and receive differential signals to/from the communication line 2 or 3. The fix control unit 12 includes a resistor R and a switch SW connected in series between the two communication lines 2a and 2b. The switch SW is generally in an open state. The fix control unit 12 performs such control as to close the switch SW in accordance with a command sent from the control unit 21. This connects the two communication lines 2a and 2b with each other via the resistor R, which fixes the potential of the two communication lines 2a and 2b at substantially the same potential. Thus, the gateway 10 and ECU 4 connected to the communication line 2 judge that the potential difference between the two communication lines 2a and 2b is approximately 0V, and determine that the signal on the communication line 2 is recessive.

Details of abnormality detection processing performed by the CAN controller 20 in the gateway 10 according to the present embodiment will be described below.

(1) Abnormal Detection Based on the Number of Consecutive Blocks

In the communication system according to Embodiment 1, the gateway 10 is configured to detect abnormality and notify the ECU 4 thereof, while each ECU 4 does not perform processing of abnormality detection. The gateway 10 needs to determine the number of consecutive blocks for all the messages transmitted or received in the communication system. As such, in the allowed block number table 24a stored in the storage unit 24 by the CAN controller 20 in the gateway 10, association between the priority level and the number of allowed blocks is stored for all the messages to be transmitted or received on the connected communication line 2 or 3.

Every time the reception unit 23 receives a message, the CAN controller 20 in the gateway 10 obtains the number of consecutive times the transmission of this message is blocked as a result of arbitration processing, from the counted values in the consecutive block number counter 21b. The CAN controller 20 according to Embodiment 1 needs to obtain the number of consecutive blocks every time a message is received, for all the messages to be received. As such, the CAN controller 20 according to Embodiment 1 counts the number of consecutive blocks by incrementing the consecutive block number counter 21b in the case where multiple consecutive messages are present on the communication line 2 or 3. Whether or not two messages are consecutive may be judged based on, for example, whether a time period from the timing at which transmission of the last bit of the first message is completed to the timing at which transmission of the first bit in the second message is started is shorter or longer than a predetermined time.

Figure 6:
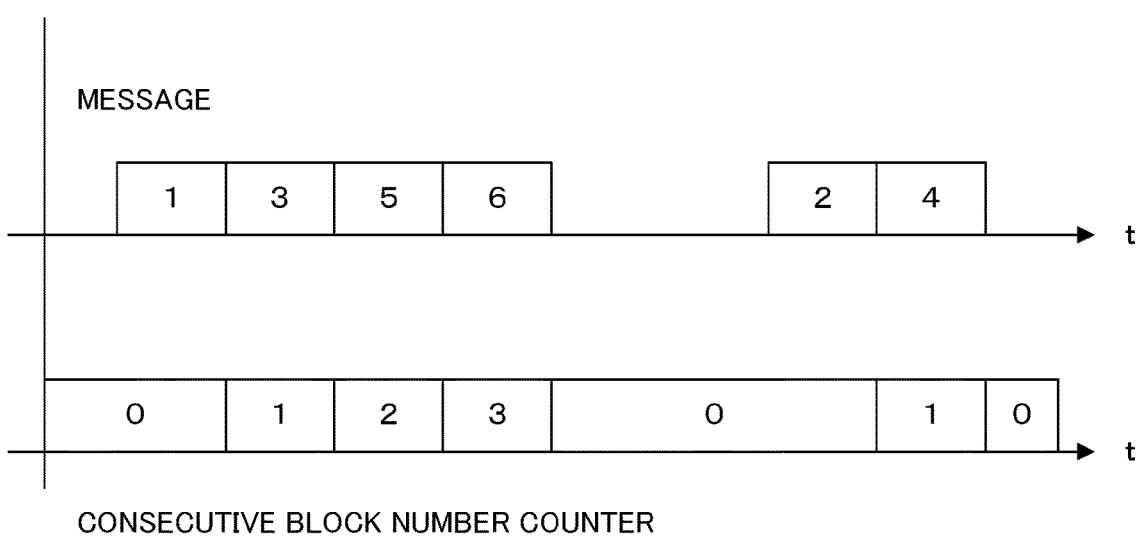
FIG. 6 is a timing chart for illustrating the operation of a counter for the number of consecutive blocks according to Embodiment 1.

FIG. 6 is a timing chart for illustrating the operation of the consecutive block number counter 21b according to Embodiment 1. If a state where a message is not transmitted to the communication line 2 or 3 occurs, the CAN controller 20 resets the consecutive block number counter 21b. This allows the value held by the consecutive block number counter 21b to be 0. In the case where messages with the IDs of 1, 3, 5 and 6 are consecutively received in the described order as illustrated in FIG. 6, the CAN controller 20 first judges that the message with the ID of 1 is consecutive to the message with the ID of 3, and adds 1 to the value of the consecutive block number counter 21b. This allows the value held by the consecutive block number counter 21b to be 1. Subsequently, the CAN controller 20 judges that the message with the ID of 3 is consecutive to the message with the ID of 5, and adds 1 to the value of the consecutive block number counter 21b. This allows the value held by the consecutive block number counter 21b to be 2. Likewise, the CAN controller 20 judges that the message with the ID of 5 is consecutive to the message with the ID of 6, and adds 1 to the value of the consecutive block number counter 21b. This allows the value held by the consecutive block number counter 21b to be 3. Thereafter, since no other messages follow consecutively from the message with the ID of 6 and no message is being transmitted onto the communication line 2 or 3, the CAN controller 20 resets the consecutive block number counter 21*b*.

Accordingly, the value of the consecutive block number counter 21*b* is 1 at the time point when, for example, reception of the message with the ID of 3 is completed, and thus the CAN controller 20 may obtain 1 as the number of consecutive blocks for this message. Moreover, the value of the consecutive block number counter 21*b* is 2 at the time point when, for example, reception of the message with the ID of 5 is completed, and thus the CAN controller 20 may obtain 2 as the number of consecutive blocks for this message. Furthermore, the value of the consecutive block number counter 21*b* is 3 at the time point when, for example, reception of the message with the ID of 6 is completed, and thus the CAN controller 20 may obtain 3 as the number of consecutive blocks for this message. As described above, the consecutive block number counter 21*b* according to Embodiment 1 counts the number of consecutive blocks for each message by counting the received number of consecutive messages.

Figure 7:
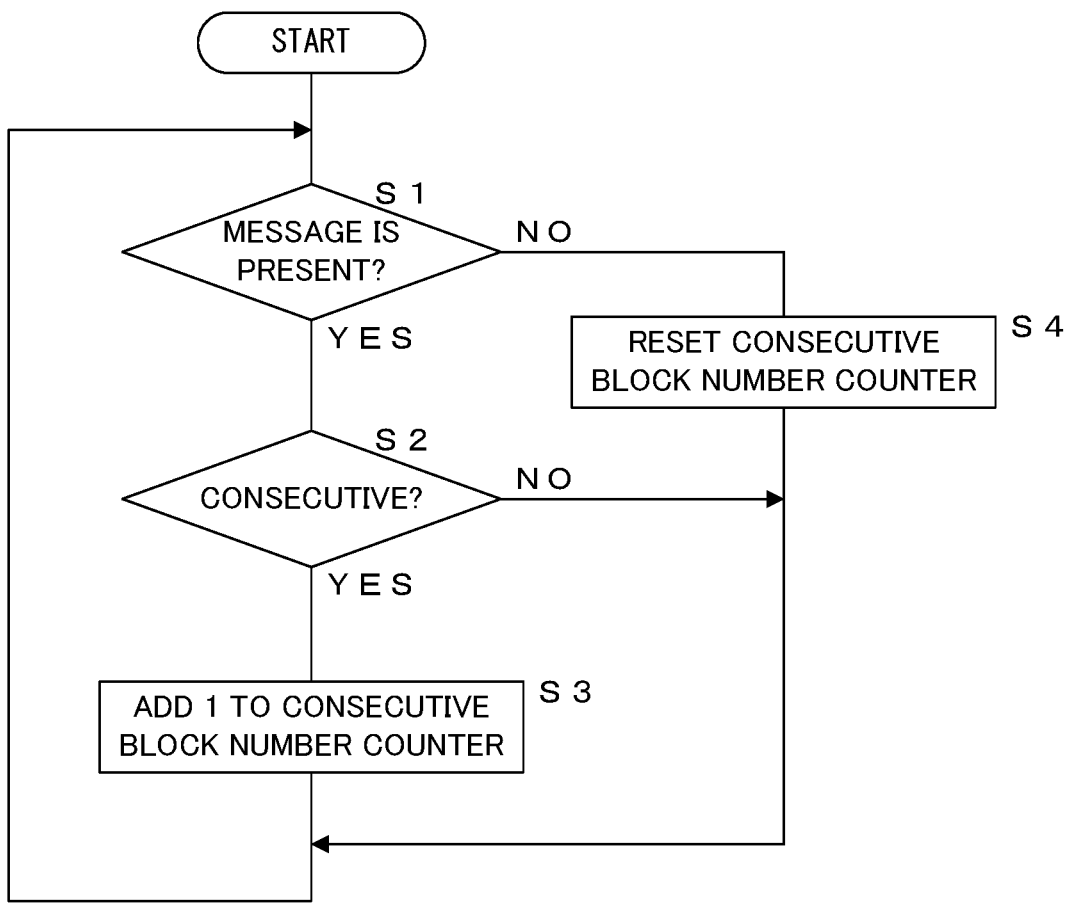
FIG. 7 is a flowchart illustrating a procedure of count processing for the number of consecutive blocks performed by the CAN controller in a gateway according to Embodiment 1.

FIG. 7 is a flowchart illustrating a procedure of count processing for the number of consecutive blocks performed by the CAN controller 20 in the gateway 10 according to Embodiment 1. The control unit 21 of the CAN controller 20 in the gateway 10 according to Embodiment 1 determines whether or not a message is present on the communication line 2 or 3 based on a result of sampling for the communication line 2 or 3 performed by the reception unit 23 (step S1). If a message is present (S1: YES), the control unit 21 determines whether or not the message is consecutive from a previous message (step S2). If the message is consecutive (S2: YES), the control unit 21 adds 1 to the consecutive block number counter 21*b* (step S3), and returns the processing to step S1. If the message is not consecutive (S2: NO), the control unit 21 returns the processing to step S1. Moreover, if no message is present on the communication line 2 or 3 (S1: NO), the control unit 21 resets the consecutive block number counter 21*b* (step S4), and returns the processing to step S1.

The CAN controller 20, which monitors a message on the communication line 2 or 3 connected thereto and causes the consecutive block number counter 21*b* to count the number of consecutive messages, detects abnormality, in the case of receiving a message, based on the counted value of the consecutive block number counter 21*b* and the number of allowed blocks stored in the allowed block number table 24*a* in the storage unit 24. In the case of receiving a message at the reception unit 23, the CAN controller 20 obtains a value counted by the consecutive block number counter 21*b* as the number of consecutive blocks. Furthermore, the CAN controller 20 obtains an ID (a priority level) contained in the received message, and obtains the number of allowed blocks associated with the ID from the allowed block number table 24*a*. If the obtained number of consecutive blocks is larger than the number of allowed blocks, the CAN controller 20 may judge that abnormal message transmission is performed for the communication line 2 or 3.

Figure 8:
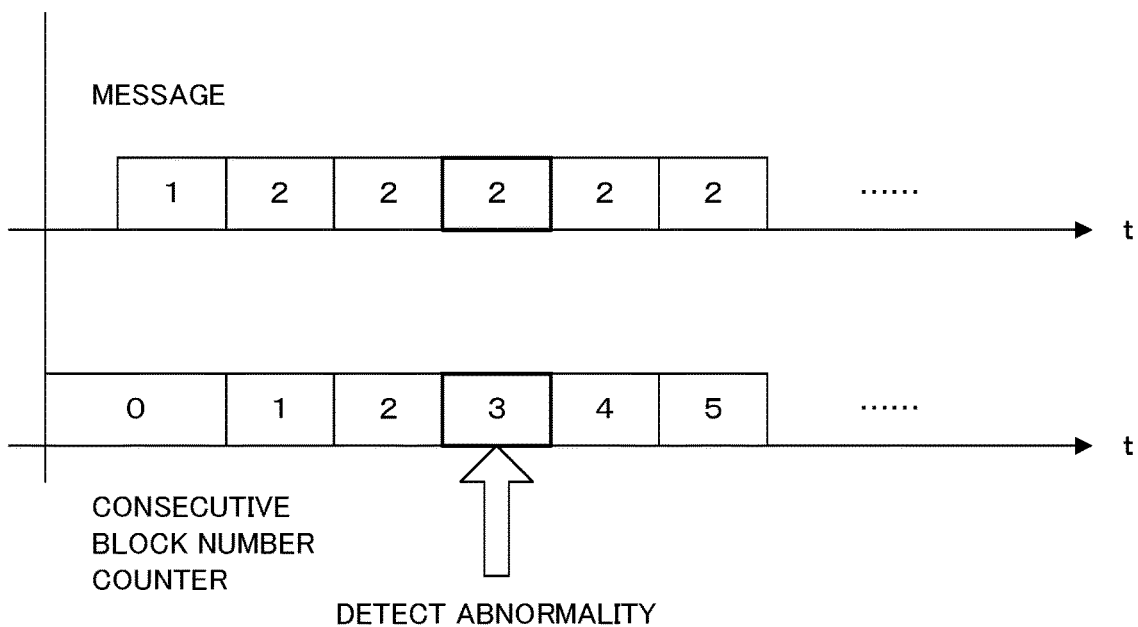
FIG. 8 is a timing chart for illustrating abnormality detection based on the number of consecutive blocks.

FIG. 8 is a timing chart for illustrating abnormality detection based on the number of consecutive blocks. In FIG. 8, a DoS attack is assumed where improper transmission of messages with the ID of 2 are consecutively performed. Moreover, as in the allowed block number table 24*a* illustrated in FIG. 4, it is assumed that the number of allowed blocks is set as 1 for the message with the ID of 1, whereas the number of allowed blocks is set as 2 for the message with the ID of 2. The CAN controller 20 does not detect abnormality for the first message with the ID of 1, the second message with the ID of 2 and the third message with the ID of 2, since the number of consecutive blocks counted by the consecutive block number counter 21*b* is not larger than the number of allowed blocks. In the case of receiving the next message with the ID of 2 (enclosed by the bold line), the CAN controller 20 detects abnormality in the transmission and reception of the messages on the communication line 2 or 3, since the number of consecutive blocks counted by the consecutive block number counter 21*b* is 3, which is larger than the number of allowed blocks of 2 set for the message with the ID of 2.

The CAN controller 20 which detected abnormality causes the control unit 21 to output a command for fixing the potential to the fix control unit 12. In response to the command, the fix control unit 12 causes the switch SW to be in a conduction state to connect two electric wires constituting the communication line 2 or 3, making it impossible to transmit messages to the communication line 2 or 3. Since such control by the gateway 10 makes it impossible to transmit messages on the communication line 2 or 3, no message transmission is performed, in practice, after detecting abnormality in the case of the timing chart illustrated in FIG. 8.

Figure 9:
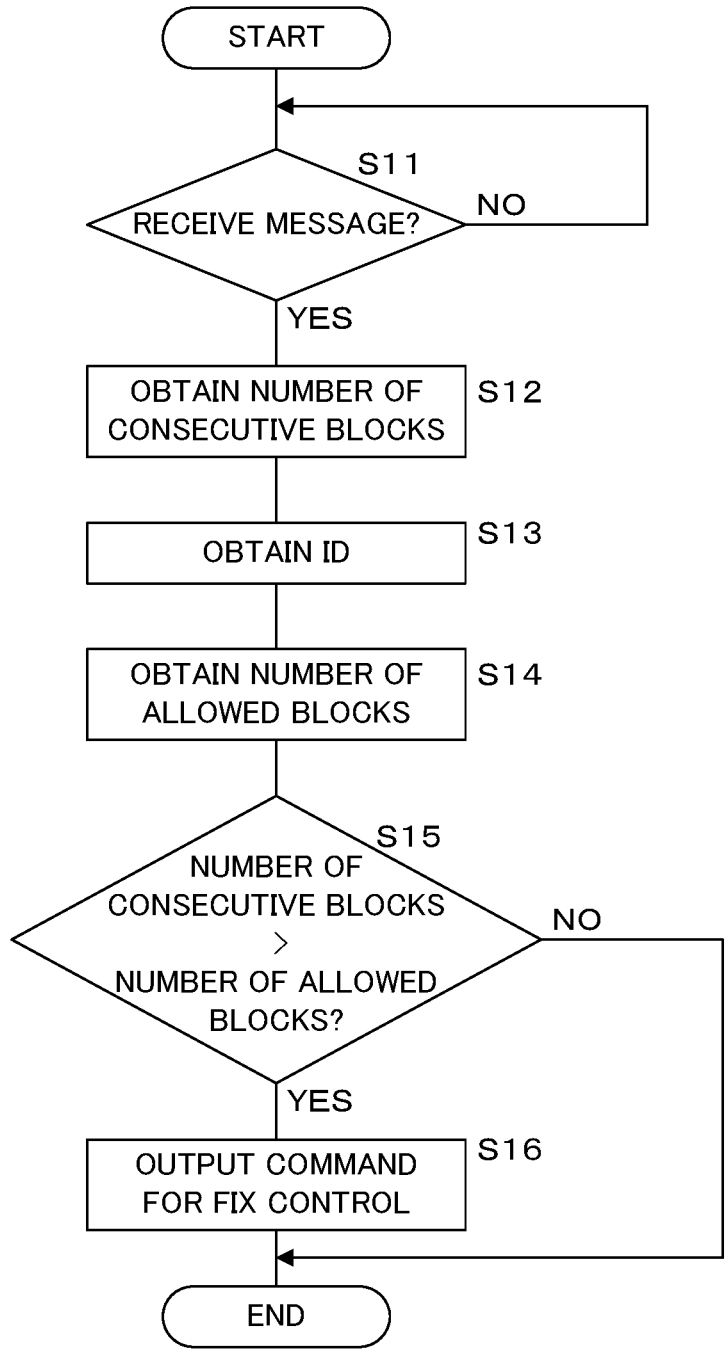
FIG. 9 is a flowchart illustrating a procedure of abnormality detection processing performed by the CAN controller in the gateway according to Embodiment 1.

FIG. 9 is a flowchart illustrating a procedure of abnormality detection processing performed by the CAN controller 20 in the gateway 10 according to Embodiment 1. The control unit 21 of the CAN controller 20 in the gateway 10 according to Embodiment 1 determines whether or not a message is received by the reception unit 23 (step S11). If a message is not received (S11: NO), the control unit 21 waits until a message is received. If a message is received (S11: YES), the control unit 21 obtains the number of consecutive blocks counted by the consecutive block number counter 21*b* at this time point (step S12).

Subsequently, the control unit 21 obtains an ID contained in the received message (step S13). The control unit 21 obtains the number of allowed blocks stored in the allowed block number table 24*a* in the storage unit 24 based on the obtained ID (step S14). The control unit 21 determines whether or not the number of consecutive blocks obtained at step S12 is larger than the number of allowed blocks obtained at step S14 (step S15). If the number of consecutive blocks is larger than the number of allowed blocks (S15: YES), the control unit 21 detects abnormality, outputs a command for fix control to the fix control unit 12 (step S16), and terminates the processing. If the number of consecutive blocks is not larger than the number of allowed blocks (S15: NO), the control unit 21 does not detect abnormality and terminates the processing.

(2) Abnormal Detection Based on the Number of Accumulated Bits

In the CAN controller 20 according to the present embodiment, the reception unit 23 receives a message by sampling on the communication line 2 or 3. Here, the CAN controller 20 performs processing of adding 1 to the bit number counter 21*c* every time the reception unit 23 receives information of 1 bit of a message. The CAN controller 20 obtains a counted value from the bit number counter 21*c* every predetermined time, and compares the obtained value with a predetermined threshold. If the accumulated bit number counted by the bit number counter 21*c* is larger than the threshold, the CAN controller 20 detects that abnormal message transmission such as a DoS attack is performed, and transmits a command for performing control to fix the potential of the communication line 2 or 3 to the fix control unit 12. Moreover, after comparison processing described above is performed every predetermined time, the CAN controller 20 resets the bit number counter 21c. It is noted that the threshold compared with the number of accumulated bits may be stored in the storage unit 24 or may be stored in the control unit 21.

Figure 10:
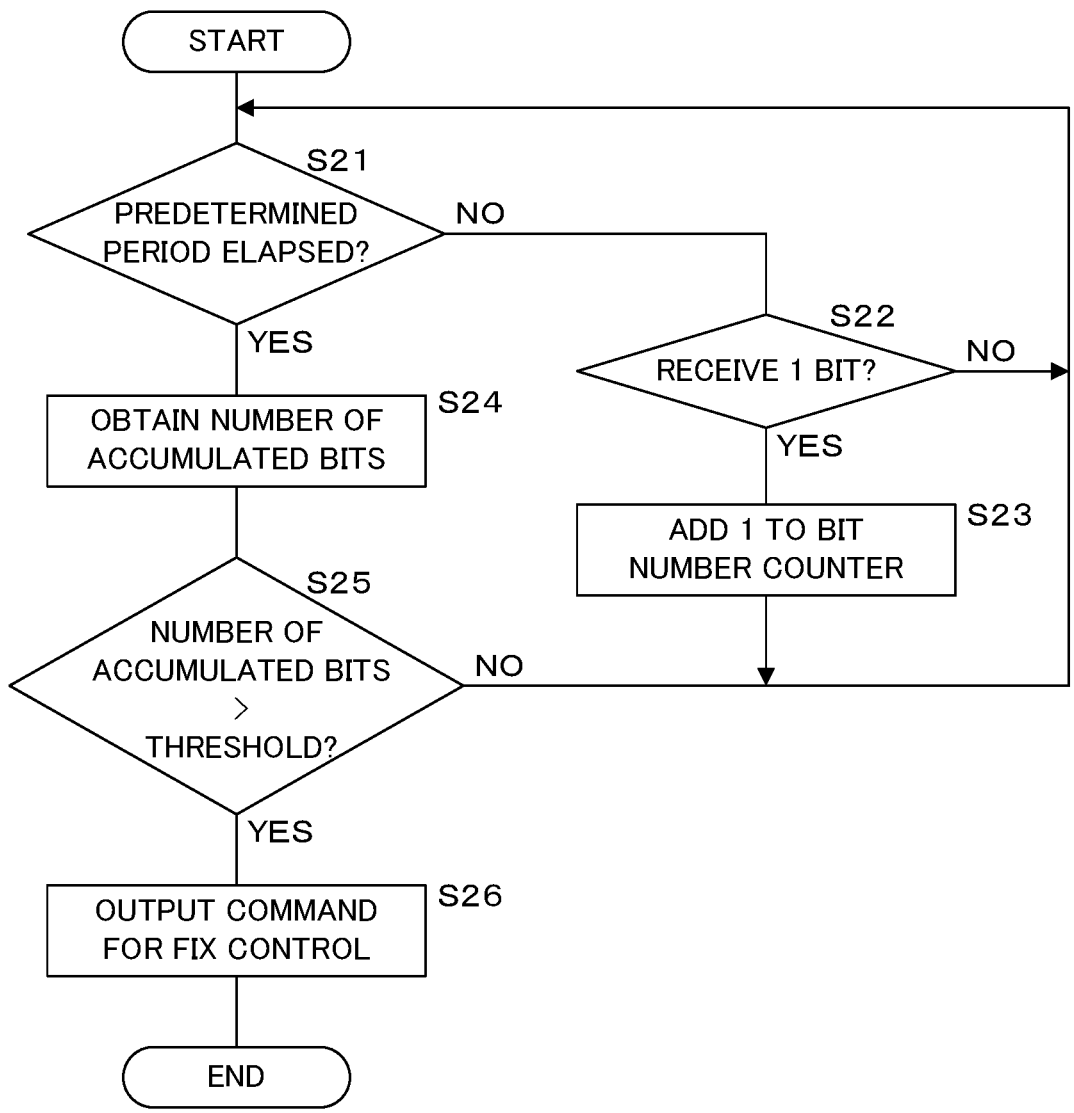
FIG. 10 is a flowchart illustrating a procedure of abnormality detection processing performed by the CAN controller in the gateway according to Embodiment 1.

FIG. 10 is a flowchart illustrating a procedure of abnormality detection processing performed by the CAN controller 20 in the gateway 10 according to Embodiment 1. The control unit 21 of the CAN controller 20 in the gateway 10 according to Embodiment 1 measures time using an internal timer function or the like. The control unit 21 determines whether or not a predetermined period of time has elapsed (step S21). If a predetermined period of time has not elapsed (S21: NO), the control unit 21 determines whether or not 1 bit contained in a message transmitted from another ECU 4 is received at the reception unit 23 (step S22). If 1 bit of a message is not received (S22: NO), the control unit 21 returns the processing to step S21, and waits until a predetermined period of time elapses or 1 bit is received.

If 1 bit of the message is received by the reception unit 23 (S22: YES), the control unit 21 adds 1 to the counted value of the bit number counter 21c (step S23), and returns the processing to step S21.

If a predetermined period of time has elapsed (S21: YES), the control unit 21 obtains the number of accumulated bits counted by the bit number counter 21c (step S24). The control unit 21 determines whether or not the number of accumulated bits obtained at step S24 is larger than a predetermined threshold (step S25). If the number of accumulated bits is not larger than the threshold (S25: NO), the control unit 21 does not detect abnormality and returns the processing to step S21. If the number of accumulated bits is larger than the threshold (S25: YES), the control unit 21 detects abnormality, outputs a command for fix control to the fix control unit 12 (step S26), and terminates the processing.

The gateway 10 according to Embodiment 1 with the configuration described above transmits and receives a message attached with a priority level (ID) to/from the ECU 4 through the communication line 2 or 3. The CAN controller 20 in the gateway 10 has an arbitration part 21a which performs so-called arbitration processing in which arbitration is performed based on a priority level to decide which message is to be transmitted, in the case where a message from its own device and a message from another device are transmitted concurrently and the transmitted messages collide with each other. The CAN controller 20 according to Embodiment 1 causes the consecutive block number counter 21b to count the number of transmitted messages that are consecutively blocked by arbitration processing, as the number of consecutive blocks. Furthermore, the CAN controller 20 stores the number of transmitted messages that are consecutively allowed to be blocked as the number of allowed blocks into the allowed block number table 24a of the storage unit 24 in association with the priority levels attached to the messages received at the communication line 2 or 3. Every time a message is received, the CAN controller 20 compares the number of consecutive blocks with the number of allowed blocks for this message, and detects abnormality if the number of consecutive blocks is larger than the number of allowed blocks.

Since the transmission of a message with high priority is not easily blocked by the arbitration processing whereas the transmission of a message with low priority is easily blocked, the gateway 10 according to the present embodiment may precisely detect abnormal message transmission such as a DoS attack by using the number of allowed blocks stored for each of the priority levels of messages in determination on the presence or absence of abnormality.

The CAN controller 20 in the gateway 10 according to Embodiment 1 constantly monitors consecutive messages on the communication line 2 or 3 connected thereto, and counts the number of consecutive messages by the consecutive block number counter 21b as the number of consecutive blocks. In the case of receiving a message at the reception unit 23, the CAN controller 20 determines whether or not the number of consecutive blocks counted by the consecutive block number counter 21b at this time point is larger than the number of allowed blocks according to the priority level attached to the received message. Accordingly, even with a system configuration where any one of devices, e.g., the gateway 10, included in the communication system performs processing of abnormality detection whereas the other ECUs 4 do not perform processing of abnormality detection, the gateway 10 may detect abnormal message transmission such as a DoS attack.

Moreover, the CAN controller 20 in the gateway 10 according to Embodiment 1 causes the bit number counter 21c to count the accumulated number of bits of a message transmitted or received on the communication line 2 or 3, and detects abnormal message transmission on the communication line 2 or 3 if the number of accumulated bits in a predetermined period of time exceeds a threshold. Accordingly, the CAN controller 20 may precisely detect a DoS attack where a large amount of improper messages are transmitted onto the communication line 2 or 3.

Furthermore, the CAN controller 20 in the gateway 10 according to Embodiment 1 causes the fix control unit 12 to perform such control as to fix the potential of the communication line 2 or 3 in the case where abnormality is detected by the method described above. This control prevents any ECU 4 from transmitting messages to the communication line 2 or 3. Therefore, in an ECU 4 not performing the processing of abnormality detection for itself, the occurrence of abnormality may be recognized from the fixed potential of the communication line 2 or 3 and error processing or the like may be performed.

While the gateway 10 and the ECU 4 are configured to communicate according to the CAN communication protocol in the present embodiment, the configuration is not limited thereto. The gateway 10 and ECU 4 may be configured to perform communication according to a communication protocol other than CAN, such as TCP/IP, Ethernet (registered trademark) or FlexRay, for example. While the communication system mounted to the vehicle 1 has been described as an example, the present technique may also be applied to a communication system other than the ones mounted to a vehicle, e.g., a communication system mounted to a mobile body such as an airplane or a vessel, or a communication system installed in a factory, an office or the like, not limited to the described example.

Variation Example

Figure 11:
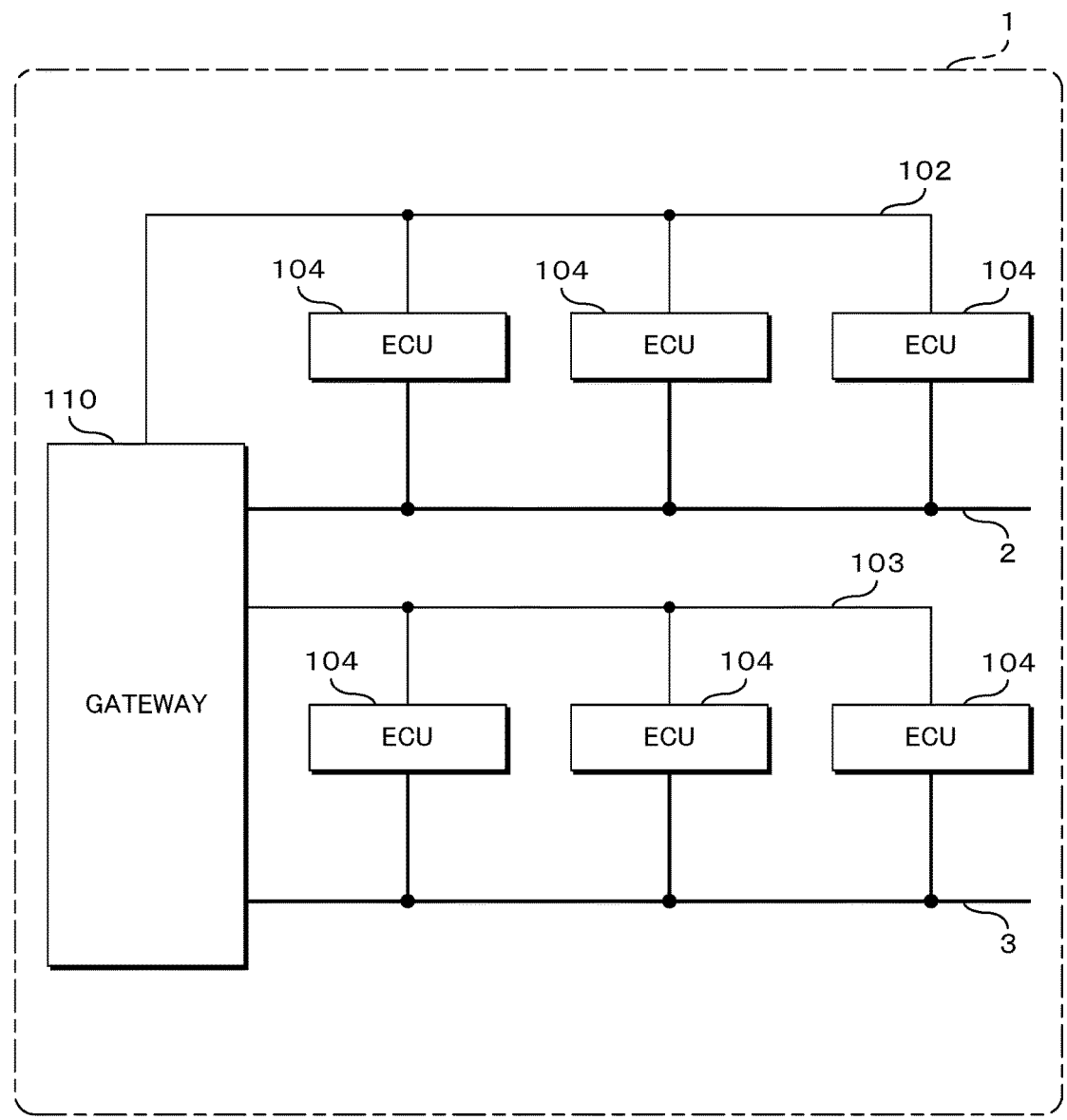
FIG. 11 is a block diagram illustrating the configuration of an in-vehicle communication system according to a variation example of Embodiment 1.

FIG. 11 is a block diagram illustrating the configuration of an in-vehicle communication system according to a variation example of Embodiment 1. The in-vehicle communication system according to the variation example is so configured that two communication lines 2 and 3 are connected to one gateway 110 while three ECUs 104 are connected to each of the communication lines 2 and 3, as in the above-described in-vehicle communication system illustrated in FIG. 1. In the in-vehicle communication system according to the variation example, however, the gateway 110 and the three ECUs 104 connected via the communication line 2 are further connected via a signal line 102. Moreover, the gateway 110 and the three ECUs 104 connected via the communication line 3 are further connected via a signal line 103.

The abnormality detection processing performed by the gateway 110 according to the variation example is the same as the abnormality detection processing performed by the gateway 10 according to Embodiment 1 described above. In the gateway 110 according to the variation example, however, the CAN controller 20 does not have the fix control unit 12, and does not perform control to fix the potential of the communication line 2 or 3 even if abnormality is detected. Alternatively, if the CAN controller 20 detects abnormality, the gateway 110 according to the variation example notifies the ECU 104 of the detection via the signal line 102 or 103. The ECU 104 which is notified from the gateway 110 via the signal line 102 or 103 is able to recognize that abnormality occurs and to perform error processing or the like.

Embodiment 2

Figure 12:
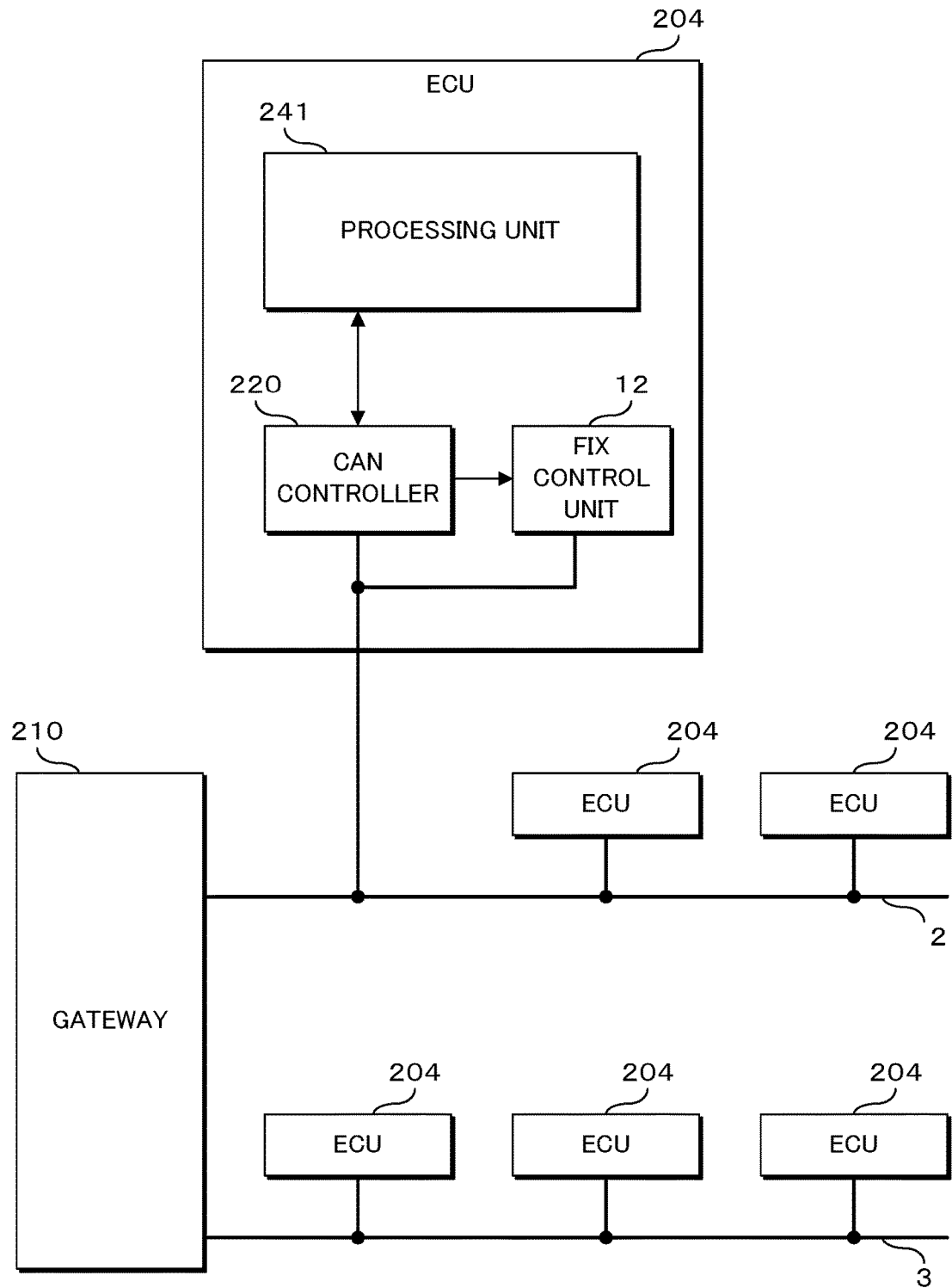
FIG. 12 is a block diagram illustrating the configuration of an in-vehicle communication system according to Embodiment 2.

FIG. 12 is a block diagram illustrating the configuration of an in-vehicle communication system according to Embodiment 2. The in-vehicle communication system according to Embodiment 2 is so configured that two communication lines 2 and 3 are connected to one gateway 210 while three ECUs 204 are connected to each of the communication lines 2 and 3, as in the above-described in-vehicle communication system illustrated in FIG. 1. In the in-vehicle communication system according to Embodiment 2, however, processing of detecting abnormal message transmission to the communication line 2 or 3 may also be performed in each ECU 204, not only in the gateway 210.

Each ECU 204 according to Embodiment 2 is configured to include a processing unit 241, a CAN controller 220, a fix control unit 12 and so forth. The processing unit 241 is configured with an arithmetic processing device such as a CPU or an MPU, for example. The processing unit 241 reads out and executes a program stored in a ROM or the like, which is not illustrated, to perform various processing concerning control of the vehicle 1. The fix control unit 12 has the same configuration as that included in the gateway 10 according to Embodiment 1 (see FIG. 5).

Though not illustrated, the gateway 210 according to Embodiment 2 has substantially the same configuration as that of the gateway 10 according to Embodiment 1 illustrated in FIG. 2, except that the CAN controller 220, which is the same as the one in the ECU 204, is included in place of the CAN controller 20.

The CAN controllers 220 included in the gateway 210 and ECU 204 according to Embodiment 2 perform, as in the CAN controller 20 according to Embodiment 1, (1) abnormal detection based on the number of consecutive blocks and (2) abnormal detection based on the number of accumulated bits, and if abnormality is detected, perform such control as to fix the potential of the communication line 2 or 3 by sending a command to the fix control unit 12. It is to be noted that (1) abnormality detection based on the number of consecutive blocks performed by the CAN controller 220 according to Embodiment 2 is somewhat different from the one described in Embodiment 1. A method of abnormality detection based on the number of consecutive blocks performed by the CAN controller 220 according to Embodiment 2 will be described below.

The CAN controller 220 according to Embodiment 2 detects abnormality for a message transmitted by itself by counting the number of consecutive blocks, while not detecting abnormality for a message transmitted by another device. As such, in the allowed block number table 24a stored in the storage unit 24 by the CAN controller 220 according to Embodiment 2, association between the priority level and the number of allowed blocks is stored for messages to be transmitted by itself. In the case where each ECU 204 is configured to transmit a message using only one ID, each ECU 204 is not required to store the allowed block number table 24a as illustrated in FIG. 4, and is only required to store one value corresponding to the number of allowed blocks set for itself.

In the case where a message to be transmitted is sent from the processing unit 11 or 241, the CAN controller 220 tries to transmit the message to the communication line 2 or 3 at the transmission unit 22. In the case where a message transmitted from its own device and a message transmitted from another device collide with each other and the message transmitted from its own device is blocked by the arbitration processing by the arbitration part 21a, based on the sampling result for the communication line 2 or 3 by the reception unit 23, the CAN controller 220 adds 1 to the value of the consecutive block number counter 21b. Thereafter, the CAN controller 220 repeatedly tries to transmit messages from itself and increments the value of the consecutive block number counter 21b every time message transmission is blocked.

Here, every time the transmission of a message from itself is blocked, the CAN controller 220 determines whether or not the number of consecutive blocks counted by the consecutive block number counter 21b is larger than the number of allowed blocks stored in the allowed block number table 24a in association with the priority level of the message. In the case where the number of consecutive blocks is larger than the number of allowed blocks, the CAN controller 220 detects abnormality in message transmission and reception on the communication line 2 or 3, and outputs a command for fix control to the fix control unit 12.

Figure 13:
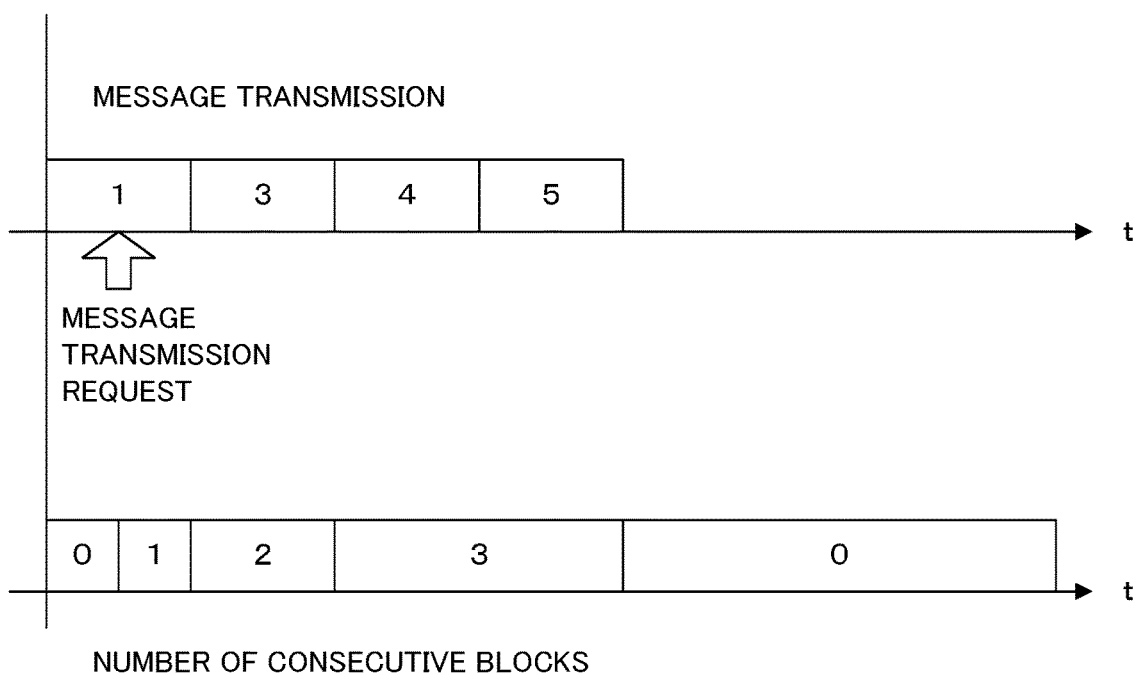
FIG. 13 is a timing chart for illustrating the operation of a counter for the number of consecutive blocks according to Embodiment 2.

FIG. 13 is a timing chart for illustrating the operation of the consecutive block number counter 21b according to Embodiment 2. FIG. 13 illustrates an example where a message with the ID of 5 is transmitted from the CAN controller 220. In the case where a message transmission request is sent from the processing unit 11 or 241, the CAN controller 220 according to Embodiment 2 tries to transmit the message to the communication line 2 or 3. Here, in the case where a message with the ID of 1 is transmitted on the communication line 2 or 3, the message transmission is blocked and the CAN controller 220 adds 1 to the value of the consecutive block number counter 21b. This allows the number of consecutive blocks counted by the consecutive block number counter 21b to be changed from 0 to 1.

After the transmission of the message with the ID of 1 is finished, the CAN controller 220 tries to transmit a message from its own device again. Here, a message with the ID of 3 is transmitted onto the communication line 2 or 3 at the same time, and the message transmission from its own device is blocked by the arbitration processing, so that the CAN controller 220 adds 1 to the value of the consecutive block number counter 21b. This allows the number of consecutive blocks counted by the consecutive block number counter 21b to be changed from 1 to 2. Likewise, after the transmission of the message with the ID of 3 is finished, the transmission of a message from the CAN controller 220 itself is blocked by the transmission of a message with the ID of 4, and thus the number of consecutive blocks counted by the consecutive block number counter 21*b* is changed from 2 to 3.

After the transmission of the message with the ID of 4 is finished, the CAN controller 220 tries to transmit a message with the ID of 5, which is assumed to be successfully transmitted. Here, the value of the consecutive block number counter 21*b* is not changed. According to the allowed block number table 24*a* illustrated in FIG. 4, the number of allowed blocks for the message with the ID of 5 is 5, whereas the value of the consecutive block number counter 21*b* obtained when the message with the ID of 5 is transmitted in the example illustrated in FIG. 13 is 3. Since the number of consecutive blocks is not larger than the number of allowed blocks, the CAN controller 220 does not detect abnormality and performs normal message transmission. The CAN controller 220 resets the consecutive block number counter 21*b* after the transmission of the message with the ID of 5 is completed. This resets the value counted by the consecutive block number counter 21*b* to be 0.

Figure 14:
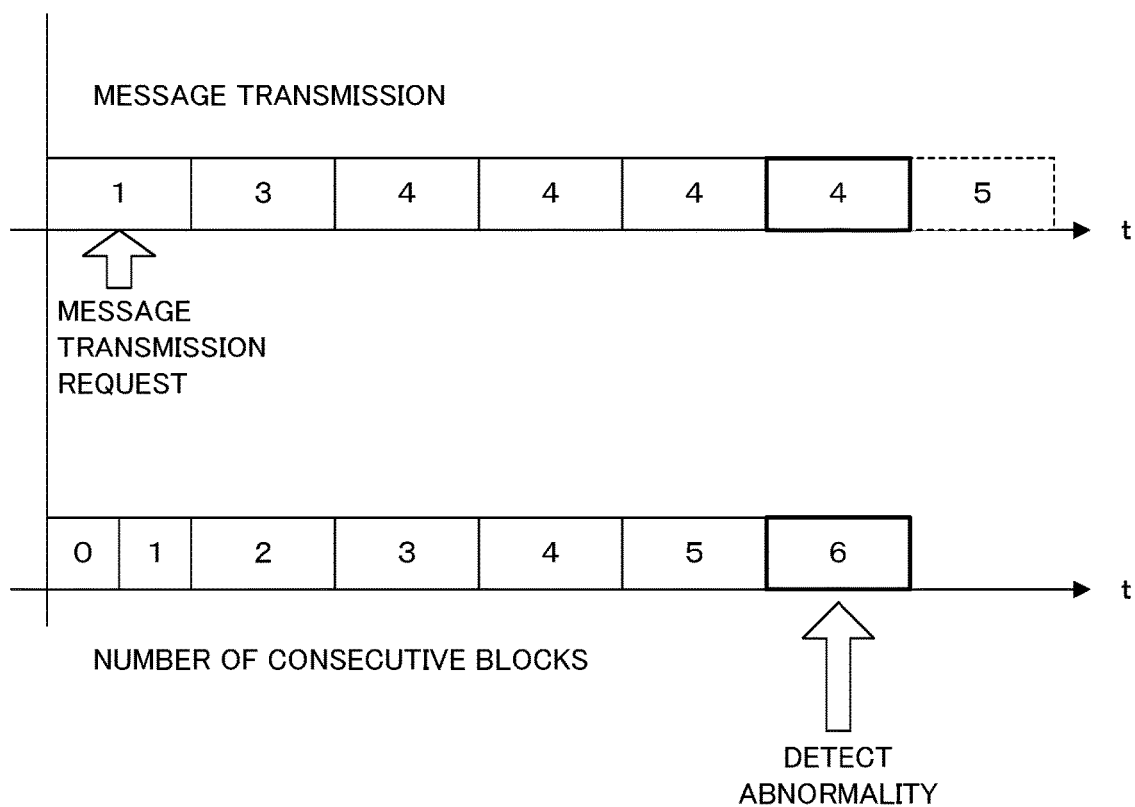
FIG. 14 is a timing chart for illustrating abnormality detection based on the number of consecutive blocks according to Embodiment 2.

FIG. 14 is a timing chart for illustrating abnormality detection based on the number of consecutive blocks according to Embodiment 2. In FIG. 14, a DoS attack is assumed where improper transmission of messages with the ID of 4 are consecutively performed. The CAN controller 220 according to Embodiment 2 adds 1 to the value of the consecutive block number counter 21*b* every time the transmission of a message with the ID of 5 from its own device is blocked. Here, the CAN controller 220 compares the number of consecutive blocks counted by the consecutive block number counter 21*b* with the number of allowed blocks associated with the ID of the message to be transmitted. If the number of consecutive blocks is not larger than the number of allowed blocks, the CAN controller 220 repeatedly tries to transmit messages until the message transmission is completed. If the number of consecutive blocks is larger than the number of allowed blocks (if the number of consecutive blocks is 6 in the present example), the CAN controller 220 detects abnormality in the message transmission and reception on the communication line 2 or 3, and outputs a command for fix control to the fix control unit 12.

In the case where the potential of the communication line 2 or 3 is fixed by the fix control unit 12 of a different device, the CAN controller 220 cannot perform processing other than receiving a recessive signal by the reception unit 23. Thus, the CAN controller 220 judges that the potential of the communication line 2 or 3 is fixed by a different device in the case where, for example, recessive signals are successively received by the reception unit 23 for a predetermined period of time. This allows the CAN controller 220 to recognize that abnormality is detected by the different device, and to perform predetermined error processing.

Figure 15:
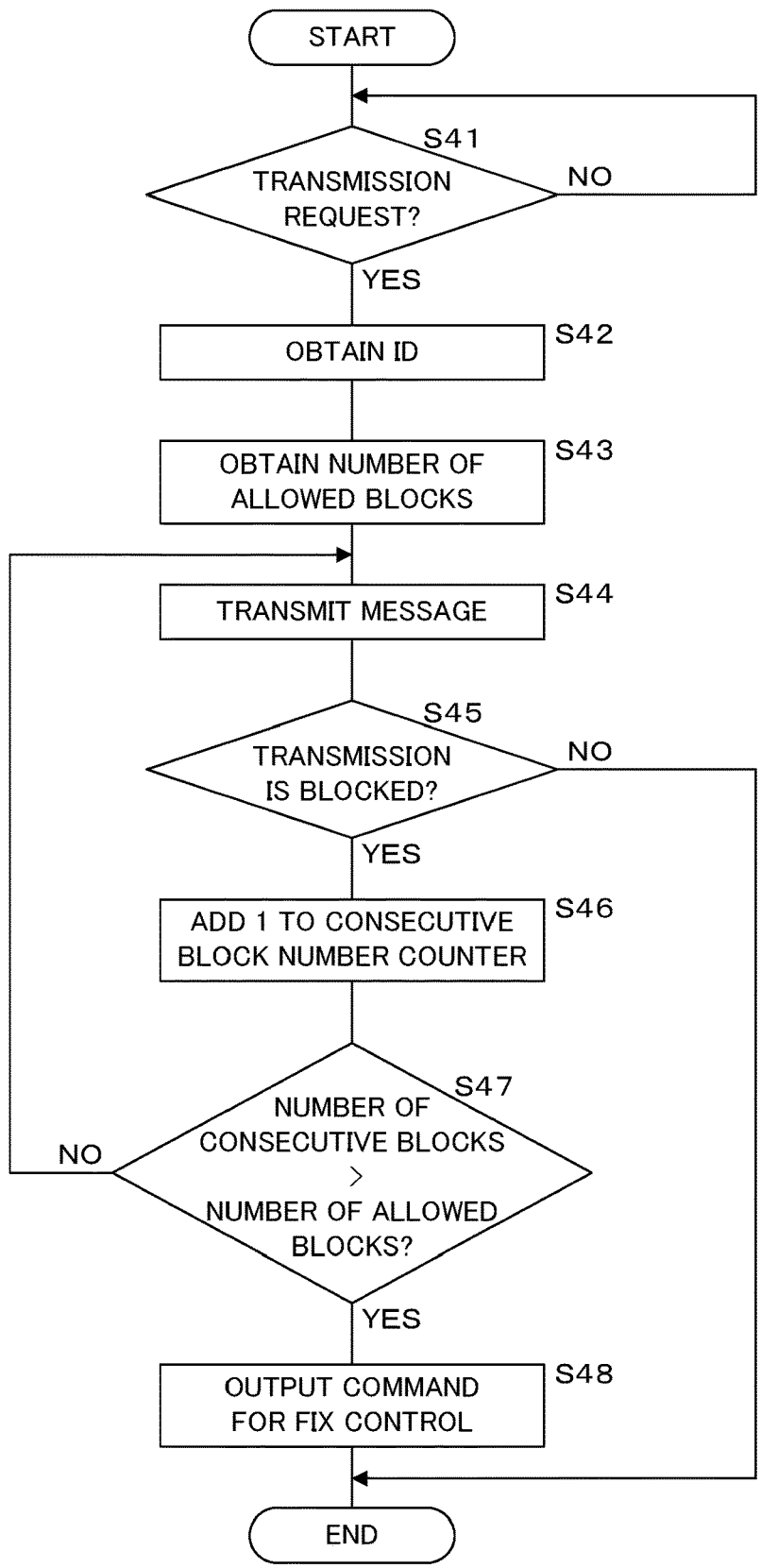
FIG. 15 is a flowchart illustrating a procedure of abnormality detection processing performed by a CAN controller according to Embodiment 2.

FIG. 15 is a flowchart illustrating a procedure of abnormality detection processing performed by the CAN controller 220 according to Embodiment 2. The control unit 21 of the CAN controller 220 according to Embodiment 2 determines whether or not a transmission request for a message is sent from the processing unit 11 or 241 to a different device (step S41). If a transmission request is not sent (S41: NO), the control unit 21 waits until the transmission request for a message is sent. If a transmission request for a message is sent (S41: NO), the control unit 21 obtains an ID from a message for transmission sent from the processing unit 11 or 241 (step S42). The control unit 21 obtains the number of allowed blocks stored in the allowed block number table 24*a* in the storage unit 24 based on the obtained ID (step S43).

Subsequently, the control unit 21 transmits a message for transmission by sending the message sent from the processing unit 11 or 241 to the transmission unit 22 (step S44). Here, the control unit 21 determines whether or not its own message transmission is blocked by message transmission by a different device (step S45). If the message transmission is not blocked (S45: NO), the control unit 21 completes the message transmission and terminates the processing.

If the message transmission is blocked (S45: YES), the control unit 21 adds 1 to the consecutive block number counter 21*b* (step S46). Moreover, the control unit 21 determines whether or not the number of consecutive blocks counted by the consecutive block number counter 21*b* at this time point is larger than the number of allowed blocks obtained at step S43 (step S47). If the number of consecutive blocks is not larger than the number of allowed blocks (S47: NO), the control unit 21 returns the processing to step S44 and continues message transmission. If the number of consecutive blocks is larger than the number of allowed blocks (S47: YES), the control unit 21 detects abnormality, outputs a command for fix control to the fix control unit 12 (step S48), and terminates the processing.

The CAN controller 220 according to Embodiment 2 as described above increments the count value of the consecutive block number counter 21*b* every time transmission of a message that had been tried in response to a transmission request from the processing unit 11 or 241 and is blocked as a result of arbitration processing. Moreover, the CAN controller 20 determines whether or not the number of consecutive blocks counted by the consecutive block number counter 21*b* is larger than the number of allowed blocks stored in the allowed block number table 24*a* in association with the ID attached to a message to be transmitted, and detects abnormality in communication. This configuration allows the CAN controller 220 to detect abnormality at the time point when it is determined that the number of sequential blocks is larger than the number of allowed blocks, even before its own message transmission is completed.

Since the other configuration parts in the in-vehicle communication system according to Embodiment 2 are similar to those in the in-vehicle communication system according to Embodiment 1, like parts are denoted by the same reference codes and will not be described in detail.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A communication device comprising:
   a controller configured for:
      transmitting and receiving a message attached with a priority level via a communication line, and
      arbitrating, in a case where message transmission from the communication device and message transmission from a different device are concurrently performed, to decide which message transmission is to be performed based on the priority level;
   a counter in which the number of consecutive blocks, which corresponds to the number of messages consecutively blocked from being transmitted as a result of arbitration by the controller, is stored; and a memory in which the number of allowed blocks, which corresponds to the number of consecutive messages allowed to be blocked, is stored in association with the priority level, wherein the controller is further configured for:
- detecting abnormality concerning communication based on the number of consecutive blocks stored in the counter and the number of allowed blocks stored in the memory, for each message to be transmitted or received by the controller, and
- determining, in a case where the controller receives a message, whether or not the number of consecutive blocks stored in the counter is larger than the number of allowed blocks stored in the memory in accordance with the priority level attached to the message.

2. The communication device according to claim 1, wherein
the controller is further configured to determine, every time a message is to be transmitted from the controller, whether or not the number of consecutive blocks stored in the counter is larger than the number of allowed blocks stored in the memory in accordance with the priority level attached to the message, and detect that abnormality concerning communication occurs at a time point when it is determined that the number of consecutive blocks is larger than the number of allowed blocks.

3. The communication device according to claim 1, further comprising:
a second counter in which the accumulated number of bits in a message transmitted or received on the communication line is stored,
wherein the controller is further configured for detecting abnormality concerning communication based on the accumulated number during a predetermined period of time.

4. The communication device according to claim 1, further comprising
a control unit performing such control as to fix a potential of the communication line if the controller detects abnormality.

5. The communication device according to claim 1, further comprising
a notification unit notifying a different device, if the controller detects abnormality, via a signal line different from the communication line.

* * * * *